United States Patent
Maca et al.

(10) Patent No.: US 11,071,081 B2
(45) Date of Patent: Jul. 20, 2021

(54) VALIDATION SUB-SYSTEM FOR TELECOMMUNICATION SYSTEM

(71) Applicant: COMMSCOPE TECHNOLOGIES LLC, Hickory, NC (US)

(72) Inventors: Gregory Allan Maca, Lynchburg, VA (US); Thomas Kummetz, Adelsried (DE)

(73) Assignee: CommScope Technologies LLC, Hickory, NC (US)

( * ) Notice: Subject to any disclaimer, the term of this patent is extended or adjusted under 35 U.S.C. 154(b) by 133 days.

(21) Appl. No.: 14/973,261

(22) Filed: Dec. 17, 2015

(65) Prior Publication Data

US 2016/0345282 A1 Nov. 24, 2016

Related U.S. Application Data

(60) Provisional application No. 62/165,588, filed on May 22, 2015.

(51) Int. Cl.
*H04W 60/00* (2009.01)
*H04W 48/16* (2009.01)
(Continued)

(52) U.S. Cl.
CPC .......... *H04W 60/00* (2013.01); *H04W 24/04* (2013.01); *H04W 48/16* (2013.01); *H04B 7/0413* (2013.01); *H04W 48/12* (2013.01); *H04W 88/08* (2013.01)

(58) Field of Classification Search
CPC ..... H04W 60/00; H04W 24/04; H04W 48/12; H04W 48/16; H04W 88/08; H04W 8/00;
(Continued)

(56) References Cited

U.S. PATENT DOCUMENTS

| 3,531,725 A | 9/1970 | Briggs |
| 5,983,106 A | 11/1999 | Bernardin et al. |

(Continued)

FOREIGN PATENT DOCUMENTS

| CN | 101242214 A | 8/2008 |
| CN | 104254983 A | 12/2014 |
| WO | 2014199342 | 12/2014 |

OTHER PUBLICATIONS

D.L. Goeckel, "Coded Modulation With Non-Standard Signal Sets for Wireless OFDM Systems," in Procedures International Conference, Vancouver, BS, Canada, pp. 751-795, Jun. 1999.*

(Continued)

*Primary Examiner* — Thomas R Cairns
(74) *Attorney, Agent, or Firm* — Fogg & Powers LLC

(57) ABSTRACT

Certain aspects and features of the present disclosure relate to a validation sub-system for determining whether access points in a telecommunication system provide suitable performance for a specified configuration of the telecommunication system. For example, a wireless receiver can simultaneous receive beacon signals at a common frequency from multiple access points. Each beacon signal has a data sequence that is different than the other beacon signals. A processing device can determine, based on the data sequences received by the wireless receiver, channel responses for channels between the access points and the wireless receiver. The processing device can output, based on the channel responses, an indicator that the access points are suitable for a specified configuration of a telecommunication system for providing wireless coverage using the access points.

20 Claims, 6 Drawing Sheets

(51) Int. Cl.
*H04W 24/04* (2009.01)
*H04B 7/0413* (2017.01)
*H04W 88/08* (2009.01)
*H04W 48/12* (2009.01)

(58) Field of Classification Search
CPC ....... H04W 8/245; H04W 8/265; H04W 8/30; H04W 12/02; H04W 48/18; H04W 48/20; H04W 52/42; H04W 60/005–06; H04W 72/14; H04W 74/0866; H04W 88/085–10; H04B 7/0413; H04B 1/0413; H04B 1/0417–0486; H04B 1/0619; H04B 1/38; H04B 1/7075; H04B 1/74; H04B 1/76; H04B 7/15; H04B 10/2575; H04L 41/0654; H04M 1/72; H05K 5/00; H05K 7/00

See application file for complete search history.

(56) References Cited

U.S. PATENT DOCUMENTS

| | | | |
|---|---|---|---|
| 6,047,185 | A | 4/2000 | Sanden |
| 7,486,953 | B2 | 2/2009 | Robinson |
| 7,962,139 | B2 | 6/2011 | Kangude et al. |
| 8,036,658 | B2 * | 10/2011 | Govindswamy ..... H04B 7/0808 455/161.1 |
| 8,045,638 | B2 * | 10/2011 | Grant ................. H04W 52/16 375/267 |
| 8,060,077 | B2 | 11/2011 | De Pomian |
| 8,077,614 | B2 | 12/2011 | Ji et al. |
| 8,179,862 | B2 | 5/2012 | Kelly et al. |
| 8,275,363 | B2 | 9/2012 | Peng |
| 8,374,607 | B2 | 2/2013 | Hagerman et al. |
| 8,391,374 | B2 | 3/2013 | Husted et al. |
| 8,396,039 | B2 | 3/2013 | Pawar et al. |
| 8,498,207 | B2 | 7/2013 | Trigui et al. |
| 8,559,951 | B2 | 10/2013 | Chen |
| 8,565,689 | B1 | 10/2013 | Rubin et al. |
| 8,660,528 | B2 | 2/2014 | Mahalingam |
| 8,676,247 | B2 | 3/2014 | Ferris et al. |
| 8,731,001 | B2 * | 5/2014 | Roman ............... H04W 56/004 370/329 |
| 8,768,418 | B2 | 7/2014 | Ho et al. |
| 8,824,432 | B2 | 9/2014 | Hu |
| 2003/0181211 | A1 | 9/2003 | Razavilar et al. |
| 2006/0089141 | A1 | 4/2006 | Ho et al. |
| 2006/0217076 | A1 | 9/2006 | Bishop |
| 2006/0252378 | A1 | 11/2006 | Bishop |
| 2006/0285523 | A1 | 12/2006 | Ishii et al. |
| 2008/0096542 | A1 | 4/2008 | Chu et al. |
| 2008/0287082 | A1 | 11/2008 | Govindswamy et al. |
| 2010/0120371 | A1 | 5/2010 | Sato et al. |
| 2010/0120415 | A1 | 5/2010 | Urquhart et al. |
| 2011/0003607 | A1 * | 1/2011 | Forenza ............... H04B 7/0413 455/501 |
| 2011/0177808 | A1 | 7/2011 | Grokop et al. |
| 2012/0115523 | A1 | 5/2012 | Shpak |
| 2012/0307704 | A1 | 12/2012 | Roman et al. |
| 2013/0017863 | A1 | 1/2013 | Kummetz et al. |
| 2013/0071112 | A1 | 3/2013 | Melester et al. |
| 2013/0077513 | A1 | 3/2013 | Ng et al. |
| 2013/0114446 | A1 | 5/2013 | Liu et al. |
| 2013/0201916 | A1 | 8/2013 | Kummetz et al. |
| 2013/0250876 | A1 | 9/2013 | Hugl et al. |
| 2014/0219267 | A1 | 8/2014 | Eyuboglu et al. |
| 2014/0370884 | A1 | 12/2014 | Kummetz et al. |

OTHER PUBLICATIONS

International Search Authority, "International Search Report and Written Opinion for PCT/US2015/066342", "from Foreign Counterpart to U.S. Appl. No. 14/973,261", dated Apr. 11, 2016, pp. 1-14, Published in: WO.

Jain, "Channel Models A Tutorial", V1 Created on Feb. 21, 2007 (Channel Models: A Tutorial, www.cse.wustl.edu/~jain/cse574-08/ftp/channel_model_tutorial.pdf).

"Characterizing a MIMO channel—Channel State Information (CSI) and Condition number", Gaussian Waves, signal processing simplified, < http://www.gaussianwaves.com/2014/08/characterizing-a-mimo-channel/ > (Dec. 17, 2015).

Manoj, Kanagalu R., "Coverage estimation for mobile cellular networks from signal strength measurements", Dissertation, University of Texas at Dallas, Apr. 1999, 115 pages.

International Application No. PCT/IB2014/062186, International Search Report and Written Opinion dated Sep. 29, 2014.

European Patent Application, "Extended European Search Report from EP Application No. 15893534.6 dated Sep. 28, 2018" From Foreign Counterpart of U.S. Appl. No. 14/973,261; pp. 1-8; Published in EP.

"3rd Generation Partnership Project; Technical specification Group Radio Access network; HSDPA Mulitpoint Transmission; (Release 11)", Generation Partnership Project (3GPP), vol. RAN WG1, No. Athens, Greece; pp. 1-28, Sep. 8, 2011.

China National Intellectual Property Administration, "First Office Action from CN Application No. 201580081614.X", from Foreign Counterpart to U.S. Appl. No. 14/973,261, dated May 12, 2020, pp. 1 through 17, Published: CN.

European Patent Office, "Extended European Search Report from EP Application No. 20172004.2", from Foreign Counterpart to U.S. Appl. No. 14/973,261, dated Oct. 1, 2020, pp. 1 through 9, Published: EP.

China National Intellectual Property Administration, "Second Office Action from CN Application No. 2015/80081614.X", from Foreign Counterpart to U.S. Appl. No. 14/973,261, dated Sep. 3, 2020, pp. 1 through 7, Published: CN.

* cited by examiner

VALIDATION SUB-SYSTEM FOR TELECOMMUNICATION SYSTEM

CROSS-REFERENCE TO RELATED APPLICATION

A priority claim is hereby made to U.S. Provisional Application Ser. No. 62/165,588, filed May 22, 2015 and titled "Validation Sub-System for Distributed Antenna System," the contents of which are incorporated herein by reference.

TECHNICAL FIELD

The present disclosure relates generally to telecommunications and, more particularly (although not necessarily exclusively), to allocating bandwidth among communication links in a telecommunication system.

BACKGROUND

Examples of a telecommunication system include a distributed antenna system ("DAS"), a small-cell network, a repeater, a radio access network. The telecommunication system can be communicatively coupled to base stations, such as (but not limited to) an eNodeB that is compliant with a Long Term Evolution ("LTE") standard.

The telecommunication system can be used to provide wireless communication coverage in a variety of environments, particularly in large structures such as office buildings, convention halls, airports, stadiums, and the like. A DAS, for example, can include one or more head-end units (e.g., master units) that are communicatively coupled to one or more base stations. The DAS can also include multiple remote units that are communicatively coupled to a head-end unit. The remote units, each of which can include one or more transceivers and antennas, can be distributed across a coverage area. The remote units can transmit downlink signals to mobile phones or other terminal devices within coverage areas serviced by the remote units and receive uplink signals from the terminal devices.

Commissioning or operating a telecommunication system can involve verifying that the telecommunication system is providing the intended signal coverage in an area serviced by the telecommunication system. Therefore, systems that facilitate this verification are desirable.

SUMMARY

Certain aspects and features of the present disclosure relate to a validation sub-system for determining whether access points in a telecommunication system provide suitable performance for a specified configuration of the telecommunication system. For example, a wireless receiver can simultaneous receive beacon signals at a common frequency from multiple access points. Each beacon signal has a data sequence that is different than the other beacon signals. A processing device can determine, based on the data sequences received by the wireless receiver, channel responses for channels between the access points and the wireless receiver. The processing device can output, based on the channel responses, an indicator that the access points are suitable for a specified configuration of a telecommunication system for providing wireless coverage using the access points.

The details of one or more aspects and examples are set forth in the accompanying drawings and the description below. Other features and aspects will become apparent from the description, the drawings, and the claims.

DETAILED DESCRIPTION

Figure 1:
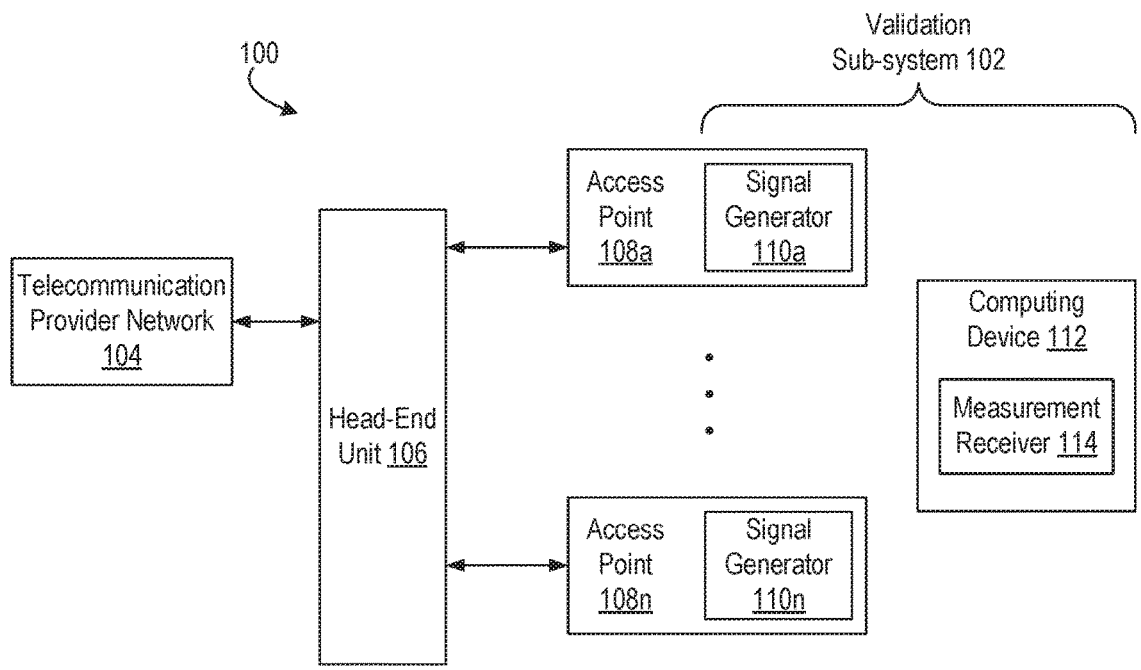
FIG. 1 is a block diagram depicting an example of a telecommunication system that includes a validation sub-system according to one aspect of the present disclosure.

Certain aspects and features of the present disclosure relate to a validation sub-system for determining whether access points in a telecommunication system provide suitable performance for a specified configuration of the telecommunication system. For example, a distributed antenna system ("DAS"), small-cell network, or other telecommunication system can include multiple access points for wirelessly communicating with terminal devices. A validation sub-system for the telecommunication system can include a measurement receiver and signal generators in the access points. The measurement receiver can receive beacon signals generated by the signal generators and transmitted by the access points. Information from the received beacon signals can be used to validate the telecommunication system by determining whether a certain configuration of the telecommunication system is performing as specified (e.g., providing adequate signal coverage, data throughout, etc.).

In some aspects, multiple access points can simultaneously broadcast or otherwise transmit beacon signals on the same frequency. Each beacon signal can include a data sequence that uniquely identifies the access point that transmitted the beacon signal. The measurement receiver can wirelessly receive the transmitted beacon signals and obtain the data sequences from the beacon signals. A computing device, which may include or be communicatively coupled to the measurement receiver, can use the data sequences obtained by the measurement receiver to determine channel responses for communication channels between the measurement receiver and the access points. The channel response can be, for example, a function modeling a change between a signal as transmitted by a transmitter and the signal as received by the receiver. The computing device can use the channel responses to determine one or more parameters associated with the performance of the telecommunication system.

In some aspects, the computing device can use the channel responses associated with two or more channels to determine parameters indicating constructive or destructive interference between the channels. Identifying interference between multiple channels can allow dead spots in a coverage area of the telecommunication system to be identified. In additional or alternative aspects, the computing device can use the channel responses to determine parameters indicating whether a set of access points may be used for multiple-input/multiple-output ("MIMO") operation. For example, if signal paths between multiple access points and a receiver are too correlated with one another, the signal paths may not be suitable for MIMO operation.

Detailed descriptions of certain examples are discussed below. These illustrative examples are given to introduce the reader to the general subject matter discussed here and are not intended to limit the scope of the disclosed concepts. The following sections describe various additional aspects and examples with reference to the drawings in which like numerals indicate like elements, and directional descriptions are used to describe the illustrative examples but, like the illustrative examples, should not be used to limit the present disclosure. The various figures described below depict examples of implementations for the present disclosure, but should not be used to limit the present disclosure.

FIG. 1 is a block diagram depicting an example of a telecommunication system 100 that at least partially includes a validation sub-system 102. The telecommunication system 100 can communicate signals between one or more telecommunication provider networks 104 in communication with the telecommunication system 100 and terminal devices located in a coverage area serviced by the telecommunication system 100. Examples of a telecommunication system 100 include a distributed antenna system ("DAS"), a repeater network, a radio-access network, a small-cell network, a cloud radio access network ("C-RAN"), etc. Terminal devices can be electronic devices used to communicate voice data or other types of data via a telecommunication system.

The telecommunication system 100 can communicate signals to terminal devices via one or more head-end units 106 and access points 108a-n that service a coverage area. The head-end unit 106 can be communicatively coupled with the access points 108a-n in any suitable manner. Communicatively coupling devices in a telecommunication system 100 can involve establishing, maintaining, or otherwise using a communication link (e.g., a cable, an optical fiber, a wireless link, etc.) to communicate information between the devices.

The head-end unit 106 can receive downlink signals from a telecommunication provider network 104 and transmit uplink signals to the telecommunication provider network 104. In some aspects, the head-end unit 106 can communicate with one or more base stations included in or communicatively coupled to one or more telecommunication provider networks 104. In additional or alternative aspects, the head-end unit 106 can communicate with one or more devices that are communicatively coupled to one or more telecommunication provider networks 104 via a data network such as (but not limited to) the Internet or other IP-based packet transport network.

Any suitable communication links can be used for communication between one or more telecommunication provider networks 104 and one or more head-end units 106. A suitable communication link can be a wired connection or a wireless connection. A wired connection can include, for example, a connection via a copper cable, an optical fiber, or another suitable communication medium. A wireless connection can include, for example, a wireless RF communication link or a microwave link.

The access points 108a-n can provide signal coverage in a geographical area serviced by the telecommunication system 100. The access points 108a-n can include transceiving devices that can include or be communicatively coupled to one or more antennas. An example of an access point is a remote antenna unit. Providing signal coverage in the coverage area can include wirelessly transmitting downlink signals received from the head-end unit 106 to terminal devices that are positioned in the coverage area. Providing signal coverage can also include wirelessly receiving uplink signals from terminal devices positioned in the coverage area. The access points 108a-n can transmit the uplink signals or data representing the uplink signals, such as packetized data generated from received uplink signals, to the head-end unit 106.

Each of the access points 108a-n can include any number of transmitter antenna elements and receiver antenna elements. In one example, an access point that is configured for single-input/single-output ("SISO") operation uses one transmitter antenna element for transmitting downlink signals and one receiver antenna element for receiving uplink signals. In another example, an access point that is configured for MIMO operation uses multiple transmitter antenna elements to transmit signals to the same terminal device and uses multiple receiver antenna elements to receive signals from the terminal device. In some aspects, one or more subsets of the access points 108a-n can be configured to operate in a MIMO mode.

For illustrative purposes, FIG. 1 depicts direct connections among the telecommunication provider network 104, the head-end unit 106, and the access points 108a-n. But a telecommunication system 100 can use any suitable implementation for communicatively coupling different communication devices. In some aspects, the head-end unit 106 can be communicatively coupled to the telecommunication provider network 104, the access points 108a-n, or both via one or more active devices, such as (but not limited to) extension units, switches, routers, or other intermediate devices. An active device can include a receiver for receiving a signal from one device in the telecommunication system 100 and a transmitter for transmitting the received signal to another device in the telecommunication system 100. In additional or alternative aspects, the head-end unit 106 can be communicatively coupled to the telecommunication provider network 104, the access points 108a-n, or both via one or more passive interfaces, such as (but not limited to) a network cable or an air interface via which wireless signals can be communicated.

The validation sub-system 102 can include signal generators 110a-n that are included in or communicatively coupled to respective access points 108a-n. Each of the signal generators 110a-n can generate a signal that is unique to a respective access point and that is transmitted by the access point. Multiple access points 108a-n can generate co-channel signals and broadcast or otherwise transmit the co-channel signals simultaneously on the same frequency. In some aspects, each of the signal generators 110a-n can be implemented using minimal hardware in a respective one of the access points 108a-n. For example, a signal generator may be included in an access point during manufacturing for factory testing purposes.

The validation sub-system 102 can also include a computing device 112. An example of the computing device is a mobile device, such as a mobile phone or tablet. The computing device 112 can include or be communicatively coupled to a measurement receiver 114.

The measurement receiver 114 can simultaneously receive beacon signals that are wirelessly broadcasted or otherwise transmitted from multiple access points 108a-n on the same frequency. In some aspects, the measurement receiver 114 can be a simple receiver, such as a zero-IF receiver with a universal serial bus ("USB") interface or other suitable communication interface. In additional or alternative aspects, the measurement receiver 114 can be a software-defined radio ("SDR"). For example, the measurement receiver 114 can be implemented as program instructions that are executed by a processor in the computing device 112. When executed, the program instructions of the SDR configure the processor and one or more receiver devices in the computing device 112 to perform one or more operations described herein.

Figure 2:
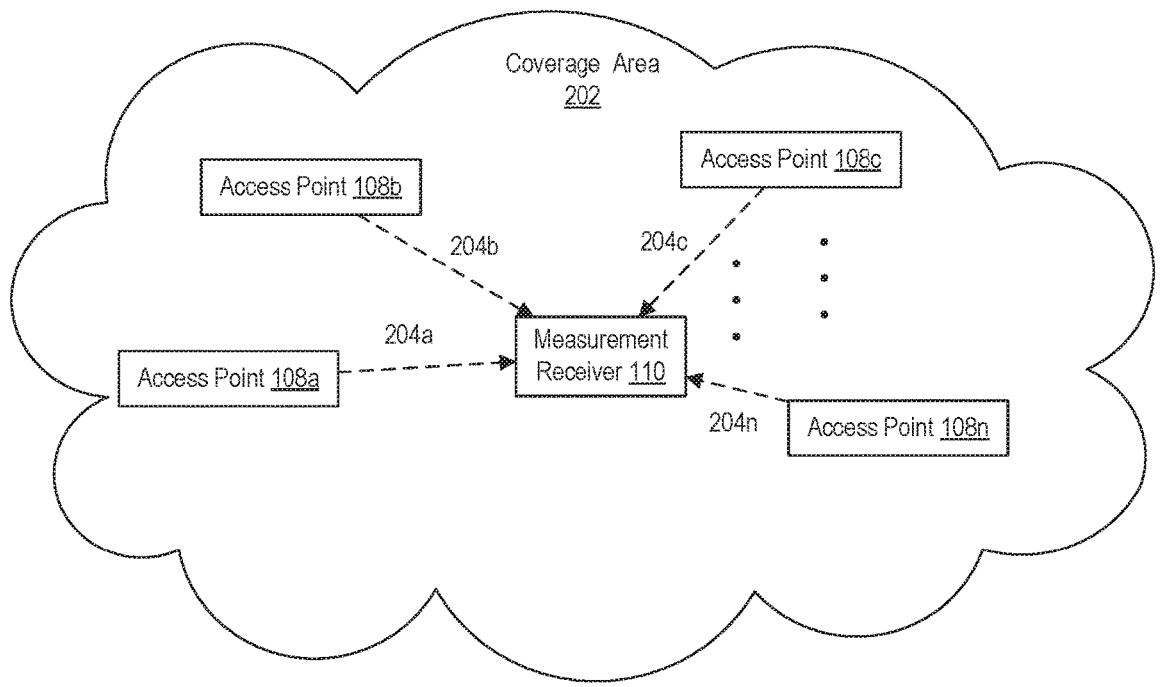
FIG. 2 is a block diagram depicting an example of using the validation sub-system of FIG. 1 according to one aspect of the present disclosure.

FIG. 2 is a block diagram depicting an example in which access points 108a-n located in a coverage area 202 transmit beacon signals 204a-n that are received by the measurement receiver 114. Each of the access points 108a-n can broadcast or otherwise transmit a respective one of the beacon signals 204a-n. Each of the beacon signals 204a-n can be unique to a respective one of the access points 108a-n that transmits the beacon signal. For example, a certain beacon signal can include a data sequence that is uniquely associated with a certain access point. The data sequence can be used by a processing device to identify the access point associated with the beacon.

In some aspects, the signal level of beacon signals 204a-n can be lower than the level of downlink signals transmitted by the access points 108a-n. The low level of the beacon signals 204a-n can be used in systems with a measurement receiver 114 that performs correlating functions.

In some aspects, the validation sub-system 102 can include the head-end unit 106 or another control device, such as (but not limited to) the computing device 112. The head-end unit 106 or other control device can select the data sequences for the beacon signals so that the data sequences do not conform to any wireless standard (e.g., code-division multiple access ("CDMA")). For example, a control device that is communicatively coupled to the access points 108a-n (either directly or via another device in telecommunication system) can transmit control signals to the access points 108a-n. The control signals can instruct the access points 108a-n to use a certain type of data sequence for the beacon signals 204a-n.

The measurement receiver 114 can be used to determine a channel response for each channel between the measurement receiver 114 and a respective one of the access points 108a-n. The channel response can be, for example, a function modeling a change between a signal as transmitted by an access point via a channel and the signal as received by the measurement receiver 114 via the channel. For example, a transmitted signal x, after being communicated through a channel H, can be transformed into a signal y. The transformation can be modeled as $y(f)=H(f)x(f)+n(f)$, where $H(f)$ is the channel response for a signal frequency f and $n(f)$ is the noise. The channel response can be caused by path loss between the access point and the measurement receiver 114 (e.g., loss of signal strength due to distance between the transmitter and receiver), shadowing between the access point and the measurement receiver 114 (e.g., loss of the transmitted signal through absorption, scattering, diffraction, etc.), and changes in signal power due to multipath characteristics of the channel between the access point and the measurement receiver 114 (e.g., reflections by objects in the signal path).

The channel response can be used to determine whether the access points 108a-n are suitable for a specified configuration of the telecommunication system. A specified configuration for the telecommunication system can include parameter values indicating a desired performance of the telecommunication system, device settings providing a desired manner in which devices of the telecommunication system are configured for communication, or both. Example of a specified configuration include (but are not limited to) one or more of a configuration providing a desired coverage area, a configuration providing desired data rates in a coverage area, a configuration of access points for communicating signals in specified many (e.g., MIMO operation).

For example, the access points 108a-n may be configured for MIMO operation in accordance with one or more wireless standards, such as the Long-Term Evolution ("LTE") standard. Each of the access points 108a-n can be associated with a respective MIMO channel. Each MIMO channel can be associated with a respective one of the beacon signals 204a-n. The measurement receiver 114 can be used to determine channel responses for the MIMO channels associated with the access points 108a-n from the transmitted beacon signals 204a-n. The channel responses can be used to determine whether the subset of the access points 108a-n is suitable for a specified MIMO configuration of the telecommunication system.

Using the measurement receiver 114 to detect multiple beacon signals simultaneously can allow the interaction between various access points to be measured directly or otherwise determined. For example, a subset of the access points 108a-n that are intended to emit the same signal on the same frequency can be tested to identify regions of constructive and destructive interference in overlapping regions of signal coverage provided by the subset of access points 108a-n. Additionally or alternatively, a subset of the access points 108a-n that are not intended to emit the same signal can be investigated for co-channel interference levels. In some aspects, interference levels can be measured simultaneously with the measurement of the beacon signals.

Any suitable frequency can be used by the access points to simultaneously broadcast the beacon signals 204a-n. In some aspects, the access points 108a-n can transmit beacon signals 204a-n at a frequency that is the same as or similar to one or more frequencies used by the telecommunication system during operation. For example, during a low-traffic period or a time period in which the telecommunication system is not communicating with terminal devices, the access points 108a-n can be configured to broadcast or otherwise transmit beacon signals at a frequency that is used to wirelessly communicate with terminal devices.

In additional or alternative aspects, the access points can broadcast or otherwise transmit beacon signals 204a-n at a frequency that is not used to communicate with terminal devices. For example, a control device in the validation sub-system 102 can select a portion of RF spectrum to be used for the beacon signals 204a-n. The control device can identify and select a portion of RF spectrum that is not used by terminal devices serviced by the telecommunication system. Using the identified portion of the RF spectrum to transmit the beacon signal can avoid causing interference with other wireless signals that are transmitted in a coverage areas serviced by the telecommunication system.

In some aspects, each of the access points 108a-n can broadcast or otherwise transmit wideband beacon signals (e.g., a beacon signal having a bandwidth of 5 MHz, 10 MHz, 15 MHz, 20 MHz, etc.) instead of one or more multiple narrowband beacon signals (e.g., multiple 30 kHz signals in different portions of a frequency band). A wideband beacon signal can provide more information about the wireless channel between a given access point and the measurement receiver 114. For example, a wideband signal, such as a 10 MHz signal, can be used to obtain information regarding multiple frequencies within the 10 MHz band. Additionally or alternatively, a wideband signal can allow performance metrics for various wideband wireless standards to be determined.

Figure 3:
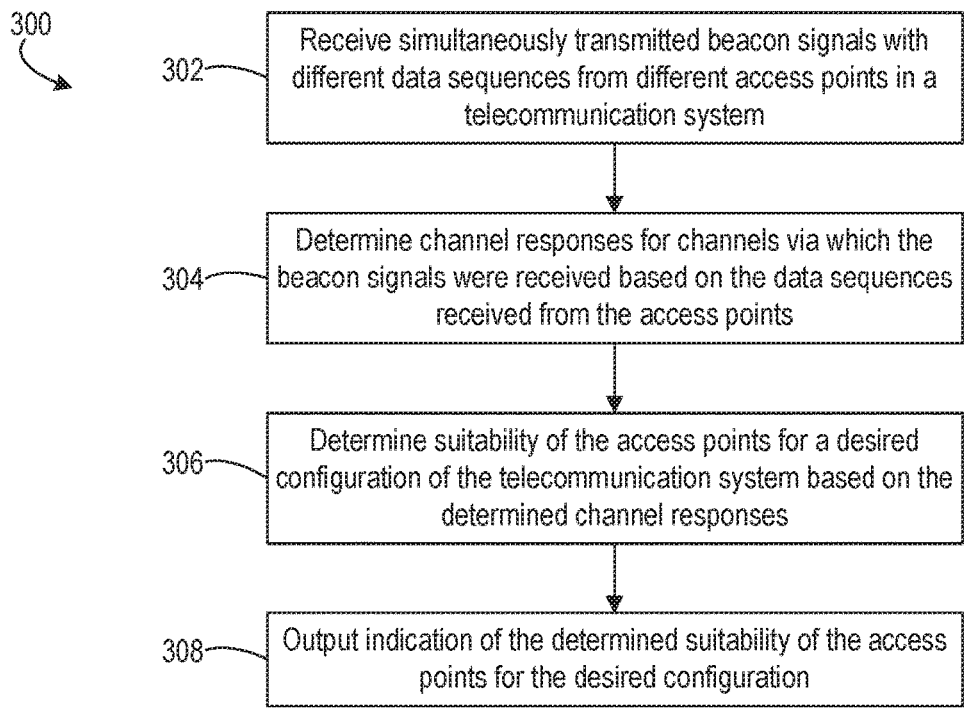
FIG. 3 is a flow chart depicting an example of a process for using the validation sub-system of FIG. 1 to determine the suitability of access points for a specified configuration of a telecommunication system according to one aspect of the present disclosure.

FIG. 3 is a flow chart depicting an example of a process 300 for using a validation sub-system to determine whether certain access points are suitable for a specified configuration of a telecommunication system. The process 300, which is described in reference to FIGS. 1 and 2, may be implemented by the validation sub-system 102 or another suitable system or sub-system.

In block 302, a measurement receiver 114 of the validation sub-system 102 receives simultaneously transmitted beacon signals with different data sequences from different access points 108a-n in a telecommunication system 100. For example, multiple access points 108a-n can simultaneously broadcast or otherwise transmit beacon signals in the manner described above with respect to FIG. 2. The measurement receiver 114 can be positioned within the coverage area of the telecommunication system 100 when the access points 108a-n broadcast or otherwise transmit the beacon signals. The measurement receiver 114 can wirelessly receive the transmitted beacon signals. In some aspects, the measurement receiver 114 can process the received beacon signals to identify data sequences for different access points 108a-n that are encoded or otherwise included in the beacon signals.

In block 304, a computing device 112 determines channel responses for channels via which the beacon signals were received based on the data sequences received from the access points 108a-n. For example, the computing device 112 can receive, from the measurement receiver 114, data sequences obtained from the received beacon signals. The computing device 112 can execute one or more algorithms that determine channel responses from the data sequences for channels between the access points 108a-n and the measurement receiver 114. For example, the computing device 112 can quantify or otherwise determine a channel response by measuring or otherwise determining an impulse response of the channel.

Multiple signal power levels and channel responses can be estimated from a single broadcast of data sequences from different access points. Estimating multiple signal levels and channel responses from a single broadcast of data sequences can simplify an interface between the measurement receiver 114 and the computing device 112. For example, measurement receiver 114 can measure, estimate, or otherwise determine signal levels and channel responses for multiple channels and provide the data describing these multiple channels to the computing device 112 in one batch, rather than sequentially testing and measuring each channel response and signal level for each access point.

In block 306, the computing device 112 determines, based on the channel responses, the suitability of the access points 108a-n for a specified configuration of the telecommunication system 100. For example, the computing device 112 can use an impulse response or other channel response to determine several system parameters for the telecommunication system 100. The computing device 112 can determine that certain parameter values indicate that the access points 108a-n are more or less suitable for a specified configuration of the telecommunication system 100.

In one example, the computing device 112 can identify faded portions of a spectrum based on the determined impulse response of one or more channels. The faded portions of the spectrum can indicate that communication links in that portion of the spectrum may have lower quality performance (e.g., data throughput).

In another example, the computing device 112 can use impulse responses for different channels to estimate the amount of multipath present in the telecommunication system 100. The computing device 112 can use the estimated amount of multipath to identify strong reflectors in the coverage area serviced by the telecommunication system 100. In some aspects, these reflectors can negatively impact performance of the telecommunication system 100.

In some aspects involving MIMO-enabled access points 108a-n, the computing device 112 can determine several multichannel parameters based on the channel responses. Examples of these multichannel parameters include channel rank as a function of frequency, an LTE-compatible rank indicator, a precoding matrix indicator, etc. The computing device 112 can determine that the access points 108a-n are more or less suitable for a specified MIMO configuration based on these multichannel parameters. For example, the computing device 112 can determine that the access points 108a-n are more or less suitable for a specified MIMO configuration based on the respective channel responses for the access points 108a-n being sufficiently different. The differences in the channel responses can be determined based on threshold differences in value for one or more of the multichannel parameters.

In some aspects, the computing device 112 can estimate the capacities of different channels based on the channel responses. The capacities of the different channels can indicate the data rates or throughput that may be supported by the channels. For example, the computing device 112 can determine whether one or more channels have sufficient capacity to support a threshold data rate for the telecommunication system 100.

In block 308, the computing device 112 outputs an indicator of the determined suitability of the access points 108a-n for the specified configuration of the telecommunication system 100.

In some aspects, the computing device 112 can output reports or other indicators that may be used for controlling operation of the telecommunication system 100. For example, the computing device 112 can output an indicator that multiple access points 108a-n are suitable for MIMO operation based on channel responses for channels between the access points 108a-n and the measurement receiver 114. The indicator of suitability may be included in a report or other output identifying the set of access points 108a-n.

In additional or alternative aspects, the computing device 112 can be communicatively coupled to a control device in the telecommunication system 100. The computing device 112 can transmit data to the control device such as the determined channel responses, suitability for MIMO operations, or another indicator of suitability for a specified configuration of the telecommunication system 100. The control device can use the data to identify certain access points that are suitable for a specified configuration (e.g., MIMO operation) and configure the identified access points accordingly. For example, the control device can transmit control signals to the identified access points with instructions or other configuration data (e.g., assignment of frequency resources for communicating with terminal devices, assignment of time slots for communicating with terminal devices, etc.).

The operation of the telecommunication system 100 can be controlled in any suitable manner using reports or other indicators outputted by the computing device 112. In some aspects, the power level of signals to be transmitted by one or more access points 108a-n can be adjusted based on an indicator, such as a power of one or more beacon signals received by the measurement receiver 114, that the access points 108a-n are not suitable for the specified configuration of the telecommunication system 100 (e.g., providing signal coverage for a specified area). For instance, if a measured beacon power is below a threshold power, the transmit power for one or more access points that transmitted one or more beacon signal with the low beacon power can be increased. In some aspects, additional beacon signals can be transmitted by the access points 108a-n after the transmit power of one or more access points has been increased. The measurement receiver 114 can be used to determine, from the additional beacon signals, that the access points 108a-n with the adjusted transmit power are suitable for the specified configuration of the telecommunication system 100.

In additional or alternative aspects, if significant interference is detected in a particular area, the telecommunication system 100 can be reconfigured (e.g., via one or more electronically controlled operations, by one or more mechanical steps such as changing cable connections, etc.) to redistribute the sectors or other units of capacity in the telecommunication system 100. In one example, in a DAS using multiple sectors, the access points associated with each sector can be changed to mitigate interference. For example, one or more access points may be reassigned from a first sector to a second sector. In another example, if significant interference is detected, the physical location of the access points can be changed. In another example, if significant interference is detected, the type of antenna or access point can be changed. For instance, an omnidirectional antenna can be changed to a directional antenna.

In some aspects, additional beacon signals can be transmitted by the access points 108a-n after one or more access points has been reconfigured or otherwise modified due to significant interference. The measurement receiver 114 can be used to determine, from the additional beacon signals, that the interference associated with one or more of the access points 108a-n has decreased and that the access points 108a-n are suitable for a specified configuration of the telecommunication system 100.

In some aspects, the validation sub-system 102 can be used to validate a telecommunication system 100 that includes one or more access points having antennas or antenna sections with different polarizations. For example, an access point having antennas or antenna sections with different polarizations may be used to transmit independent data streams. The different polarizations can separate the different data streams transmitted using different antennas or antenna sections. The validation sub-system 102 can verify that the different polarizations are providing sufficient separation.

For example, an access point having at least two antennas or antenna sections with different polarizations can be configured to transmit at least two different beacon signals, respectively. The access point can simultaneously transmit the two beacons signals using the same frequency. The measurement receiver 114 can be used to determine one or more channel responses between the access point and the measurement receiver 114. The computing device 112 can determine a degree of separation between the beacon signals based on the channel response. If the determined degree of separation is greater than or equal to a threshold value, the computing device 112 can output an indicator that the polarizations of the two antennas or antenna sections are sufficiently different. If the determined degree of separation is less than the threshold value, the computing device 112 can output an indicator that the polarizations of at least one of the antennas or antenna sections should be adjusted to provide greater separation between signals transmitted by the antennas or antenna sections.

In some aspects, a control device in the telecommunication system 100 can receive or determine an indicator that the access points 108a-n are suitable for the specified configuration after one or more access points have been modified using a previous indicator. In one example, the control device may receive the indicator from the computing device 112. Based on this indicator, the control device can cause the access points 108a-n to communicate with wireless terminal devices using the specified configuration.

Figure 4:
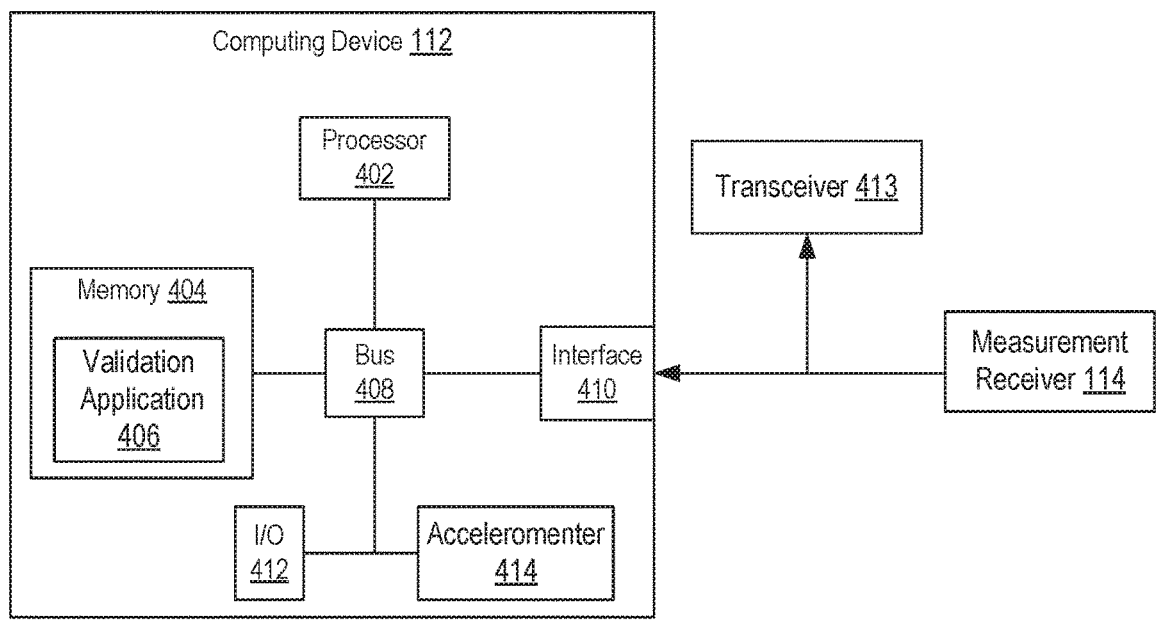
FIG. 4 is a block diagram depicting an example of a computing device that can be included in the validation sub-system of FIG. 1 according to one aspect of the present disclosure.

Any suitable computing device 112 can be used in the validation sub-system 102. For example, FIG. 4 is a block diagram depicting an example of the computing device 112. The computing device 112 can include a processor 402 that is communicatively coupled to a memory 404. The processor 402 is a device that can include one or more microprocessors, one or more application-specific integrated circuits, or one or more other suitable processing devices. The processor 402 can execute computer-executable program instructions and access information stored in the memory 404.

The memory 404 can include any suitable non-transitory computer-readable medium. The computer-readable medium can include one or more electronic, optical, magnetic, or other storage devices capable of providing the processor 402 with computer-readable program instructions. Non-limiting examples of a computer-readable medium include a magnetic disk, memory chip, optical storage, or any other medium from which a computer processor can read instructions. The program code may include processor-specific instructions written in any suitable computer-programming language.

The computing device 112 can also include a bus 408. The bus 408 can include one or more circuits that communicatively couple one or more components of the computing device 112.

A validation application 406 can be stored in the memory 404 and executed by the processor 402. In additional or alternative aspects, the validation application 406 may be resident in any suitable computer-readable medium and may be executed on any suitable processing device. Executing the validation application 406 can configure the processor 402 to perform one or more of the operations described herein.

The computing device 112 can include or be communicatively coupled with a number of external or internal devices, such as input or output devices. For example, FIG. 4 depicts the computing device 112 with an input/output ("I/O") interface 412 that can receive input from input devices or provide output to output devices.

The computing device 112 can also include one or more interfaces 410. An interface 410 can include any device or group of devices suitable for establishing a data connection to one or more of a measurement receiver 114 and a transceiver 413. An example of the interface 410 is a USB interface having one or more USB ports.

The measurement receiver 114 can receive beacon signals transmitted by one or more of the access points 108a-n. In some aspects, the measurement receiver 114 can include one or more antenna elements for receiving the beacon signals. In additional or alternative aspects, the measurement receiver 114 can receive the beacon signals via a separate transceiver 413.

In some aspects, the measurement receiver 114 can also determine signal levels for signals in the coverage area, such as test signals received by the transceiver 413 and provided to the measurement receiver 114. The processor 402 can identify the test signals by decoding identifiers encoded in the test signals by other units of the telecommunication system 100. The processor 402 can obtain the test signal levels from the measurement receiver 114. The processor 402 can execute the validation application 406 to generate data about the telecommunication system 100 (e.g., coverage contour data that describes signal coverage throughout a coverage area) based on the test signal levels obtained from the measurement receiver 114.

In some aspects, the measurement receiver 114 can scale in complexity depending on one or more of the types of measurements to be made, the speed of the measurements, and the allowable cost of the receiver. For example, the measurement receiver 114 may be a single-channel zero-IF ("ZIF") receiver that is connected directly to the computing device 112 having a USB interface. In this example, little or no digital processing hardware may be included in the measurement receiver 114. Data samples can be provided directly to the computing device 112 via the USB interface or other suitable interface 410. The processor 402 can process the data samples received from the measurement receiver 114.

In other aspects, the measurement receiver 114 can include a multi-channel ZIF receiver and a digital signal processor ("DSP"). The DSP can be used to facilitate MIMO measurements or other analysis of communication channels. For example, the DSP can process samples obtained by the ZIF receiver, thereby simplifying the interface with the computing device 112 and reducing the processing requirements for the processor 402.

In some aspects, the transceiver 413 can communicate with other devices in the telecommunication system 100, control units external to the telecommunication system 100, or both. For example, the processor 402 can generate outputs that are transmitted via the transceiver 413 to a data network that is used to communicate with devices in the telecommunication system 100, control units external to the telecommunication system 100, or both.

In some aspects, the computing device 112 can be a mobile device external to the telecommunication system 100. For example, the computing device 112 can use the transceiver 413 to communicate with a head-end unit 106 via the telecommunication provider network 104 or another data network.

In some aspects, the computing device 112 can include an accelerometer 414. The processor 402 can automatically determine the physical location of an operator of the computing device 112 based on movement detected by the accelerometer 414. The processor 402 can correlate the measured data with a corresponding position on a floor plan without an input from the operator identifying the operator's location. In other aspects, the accelerometer 414 can be omitted from the computing device 112.

Figure 5:
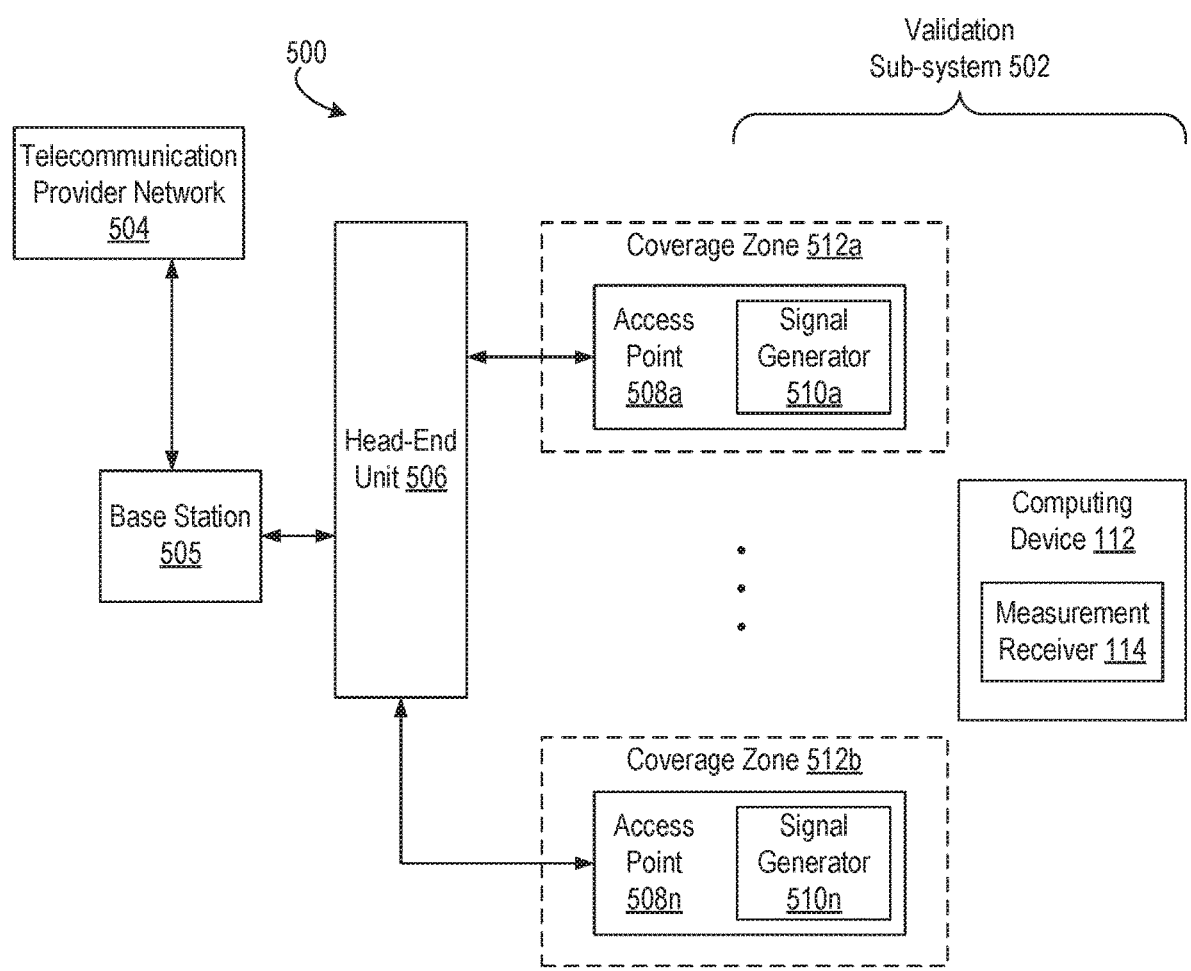
FIG. 5 is a block diagram depicting an example of a distributed antenna system that includes a validation sub-system according to one aspect of the present disclosure.

Any suitable telecommunication system 100 can be used with the validation sub-system 102. In some aspects, the telecommunication system 100 can include a DAS. For example, FIG. 5 is a block diagram depicting an example of a DAS 500 that includes a validation sub-system 502. The DAS 500 can communicate with one or more base stations 505 that are included in or communicatively coupled to a telecommunication provider network 504. The DAS 500 can communicate signals between the base station 505 and one or more terminal devices that are positioned in coverage zones 512a-n that are serviced by the DAS 500.

The DAS 500 can include a head-end unit 506 (e.g., a master unit, a base station router, etc.) that is communicatively coupled to one or more base stations 505. The head-end unit 506 can also be communicatively coupled with access points 508a-n (e.g., remote antenna units) that wireless communicate with terminal devices. The access points 508a-n are examples of the access points 108a-n described herein with respect to FIG. 1, and the signal generators 510a-n are examples of the signal generators 110a-n described herein with respect to FIG. 1.

Although FIG. 5 depicts direct connections between the head-end unit 506 and various other devices, other implementations are possible. In some aspects, the head-end unit 506 can be communicatively coupled to the access points 508a-n via one or more extension units or other intermediate devices.

Figure 6:
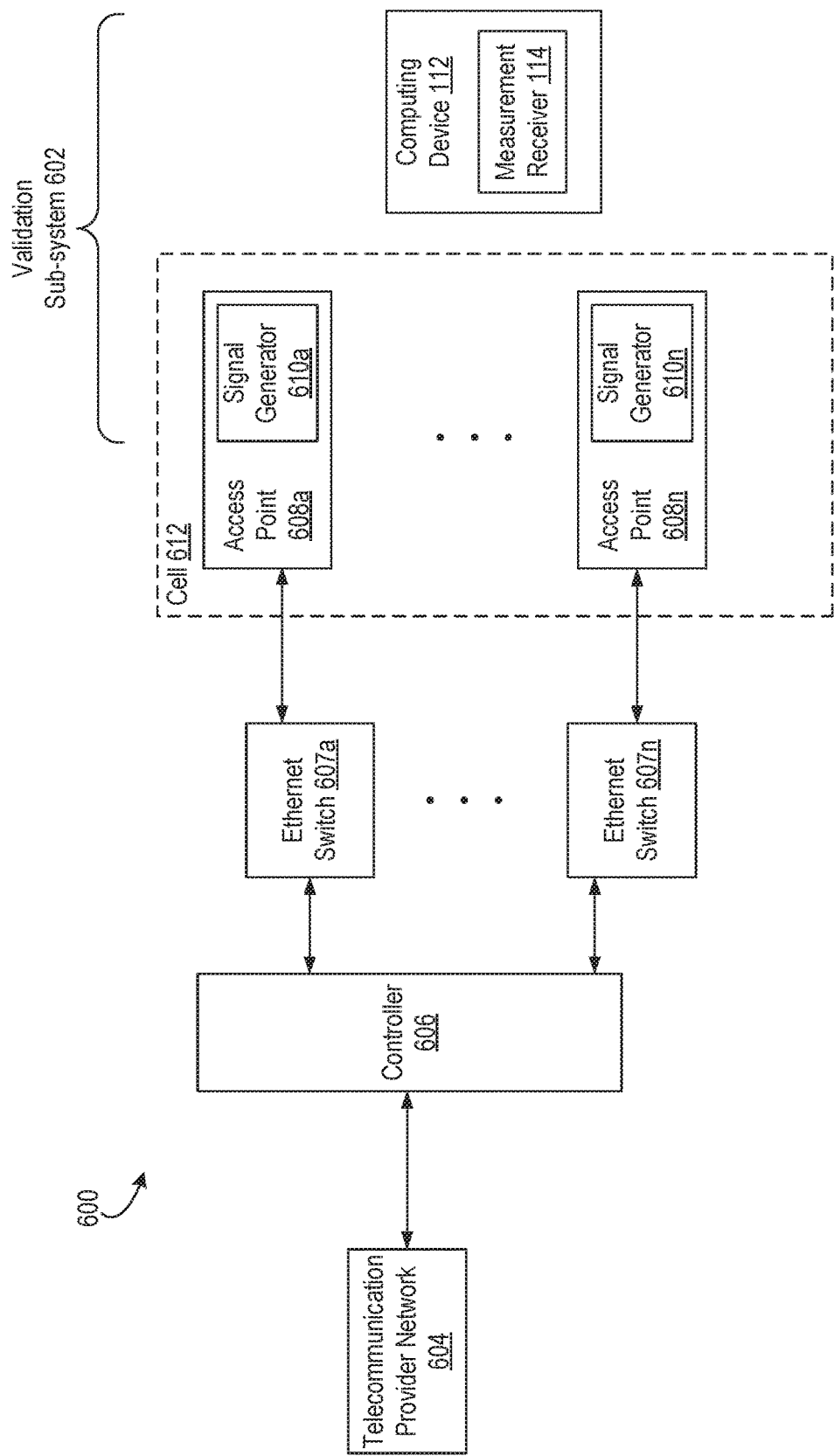
FIG. 6 is a block diagram depicting an example of a cloud radio access network that includes a validation sub-system and that uses multiple access points to provide a common cell according to one aspect of the present disclosure.

In additional or alternative aspects, the telecommunication system 100 can include a C-RAN in which multiple access points providing a common cell. FIG. 6 is a block diagram depicting an example of a C-RAN 600 that includes multiple access points 608a-n configured for providing a common coverage cell 612.

The C-RAN 600 can include a controller 606 that is communicatively coupled to a telecommunication provider network 604. The controller 606 can be communicatively coupled to a telecommunication provider network 604, which can include a core network of the telecommunication provider. This core network may include devices that implement functions defined in the Long Term Evolution ("LTE") standard, such as devices with mobility management entity ("MME") functions and serving gateway ("SGW") functions. The controller 606 can communicate with the telecommunication provider network 604 via the Internet or other IP-based packet transport network. In some aspects, the controller 606 can include certain MME functionality and SGW functionality.

The controller 606 can be communicatively coupled to access points 608a-n via one or more Ethernet switches 607a-n. The controller 606 can perform functions such as (but not limited to) Media Access Control ("MAC") layer (Layer 2) processing, and upper layer (Layer 3 and above) processing. For example, the controller 606 can perform real-time scheduling of traffic to and from terminal devices. The controller 606 can also assign resource bins (e.g., one or more frequency resources for certain time slots) to various access points 608a-n. The controller 606 may also perform other functions such as processing IP data.

The access points 608a-n can perform RF front-end functions. In some aspects, the access points 608a-n can receive timing information from the controller 606 that allows certain subsets of the access points 608a to simultaneously transmit signal to terminal devices or receive signals from certain terminal devices. The cell 612 that is formed using the access point 608a-n can send data to terminal devices using time-frequency resources, such as resource bins specified according to the LTE standard. The controller 606 can identify which access points are to transmit data to terminal devices using certain resources for the terminal device based on signals received from the terminal devices.

In the C-RAN 600, a validation sub-system 602 can include the computing device 112 and signal generators 610a-n of the access points 608a-n. The access points 608a-n are examples of the access points 108a-n described herein with respect to FIG. 1, and the signal generators 610a-n are examples of the signal generators 110a-n described herein with respect to FIG. 1.

The timing and resource information provided from the controller 606 to the access points 608a-n can allow the access points 608a-n to generate and simultaneously beacon signals that are received by a measurement receiver 114. The controller 606 can assign certain resource bins for broadcasting or otherwise transmitting beacon signals that can be received by the measurement receiver 114. For example, the controller 606 can execute a scheduling function that identifies one or more resource bins that are not assigned to any of the access points 608a-n for communicating with terminal devices. The controller 606 can select the identified resource bins and assign the identified resource bins to some or all of the access points 608a-n for transmitting beacon signals. The access points 608a-n can use the assigned resource bins to transmit respective beacon signals in the manner described herein with respect to FIG. 2.

Figure 7:
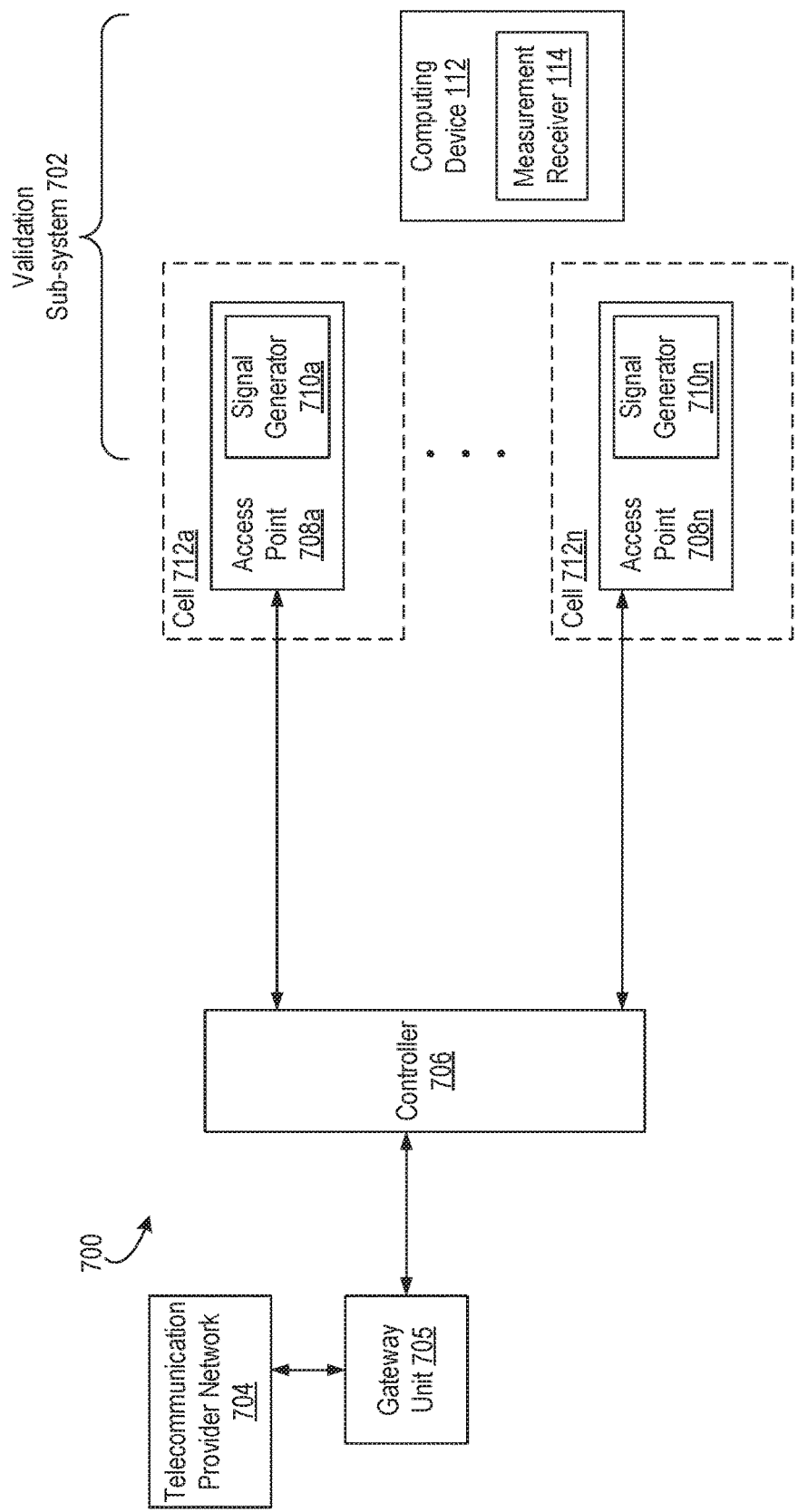
FIG. 7 is a block diagram depicting an example of a small-cell telecommunication system that includes a validation sub-system according to one aspect of the present disclosure.

In additional or alternative aspects, the telecommunication system 100 can include multiple access points that are small-cell base stations. FIG. 7 is a block diagram depicting an example of a small-cell telecommunication system 700 that includes a validation sub-system 702.

The small-cell telecommunication system 700 can include a controller 706 and access points 708a-n. The access points 708a-n can respectively service cells 712a-n. The controller 706 can provide a standard interface for communicating with different core networks that are included in one or more telecommunication provider networks 704. The links to the core networks can be established via any suitable architecture, such as (but not limited to) S1, Iuh, 3GPP interfaces, and the like.

The controller 706 can manage the backhaul links to one or more core telecommunication provider networks 704. Backhaul links can include communication links between a core network or backbone network and the small-cell telecommunication system 700. The backhaul links to the one or more core networks of telecommunication providers can include one or more gateway units 705. The gateway units 705 can manage communication between one or more core telecommunication provider networks 704 and the small cells 712a-n. In additional or alternative aspects, the gateway units 705 can be omitted and the controller 706 can communicate directly with the one or more core networks of telecommunication providers.

The access points 708a-n can service the cells 712a-n. In some aspects, one or more of the access points 708a-n can include multiple antennas for receiving MIMO signals. The cells 712a-n can have any suitable geographic range. Non-limiting examples of the cells 712a-n include femtocells, picocells, microcells, etc. The access points 708a-n can perform wideband RF communication with terminal devices in the cells 712a-n. Each of the access points 708a-n can include an optical/electrical digital transport module, an analog-to-digital converter, a digital-to-analog converter, one or more filters, an up-conversion module, a down-conversion module, a power amplifier, and a low noise amplifier.

In additional or alternative aspects, the controller 706 can provide an interface to an enterprise local area network ("LAN") that facilitates data communication among computing devices in a building or other area serviced by the small-cell telecommunication system 700. The controller 706 can provide an interface via which data traffic can be communicated between terminal devices accessing the small-cell telecommunication system 700 and devices in the LAN. For example, the controller 706 can communicate data from a terminal device accessing the small-cell telecommunication system 700 to a printer connected to the LAN.

In additional or alternative aspects, the controller 706 can provide an interface to the Internet or other suitable data networks external to the building or other area serviced by the small-cell telecommunication system 700. The controller 706 can allow data traffic to be routed to networks other than the one or more core networks of telecommunication providers.

In aspects involving the small-cell telecommunication system 700, the controller 706 can assign certain resource bins for broadcasting or otherwise transmitting beacon signals that can be received by the measurement receiver 114. For example, the controller 706 can transmit control signals to the small-cell access points 708a-n for synchronizing operations of the access points 708a-n. The control signals can cause the access points 608a-n to simultaneously transmit respective beacon signals in the manner described herein with respect to FIG. 2.

Figure 8:
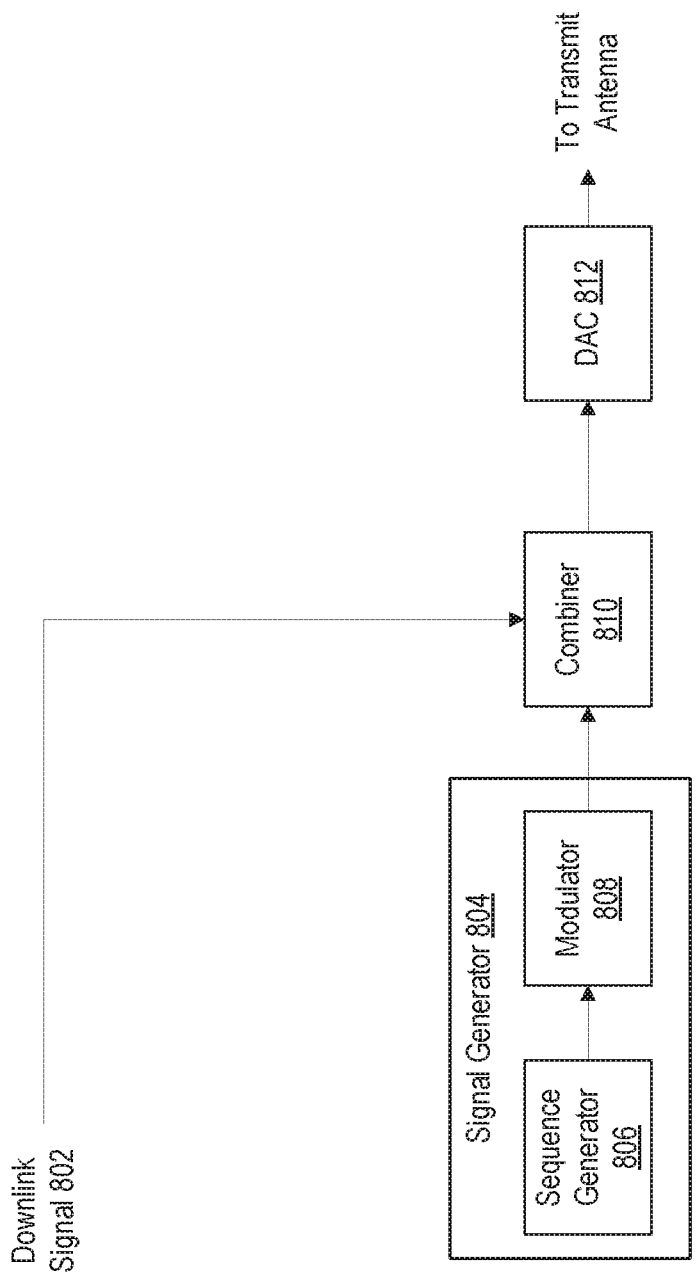
FIG. 8 is a block diagram depicting an example of a signal generator for a validation sub-system according to one aspect of the present disclosure.

Any suitable signal generator for the access points depicted in one or more of FIGS. 1, 2, and 5-7. FIG. 8 is a block diagram depicting an example of a signal generator 804 for a validation sub-system.

In the example depicted in FIG. 8, a digital transmitter in an access point can be implemented using a periodic signal generator 804. The periodic signal generator 804 can include a binary sequence generator 806 and quadrature amplitude modulation ("QAM") modulator 808. A combiner 810, such as (but not limited to) a summer, can add or otherwise combine the output of the periodic signal generator 804 combined with a downlink signal 802 that is to be transmitted by the access point. The combined digital signal can be converted to an analog signal using the digital-to-analog converter 812 and provided to a transmit antenna of the access point. In some aspects, an access point with this type of digital transmitter may be routinely included in an access point to facilitate factory testing.

In some aspects, the sequence generator 806 can generate multiple unique sequences. The use of multiple unique sequences can allow multiple access points to broadcast or otherwise transmit beacon signals simultaneously. Low correlation can exist between the individual sequences. Any type of sequence having suitable autocorrelation properties can be used. Examples of suitable unique sequences with low correlation include a pseudo noise code or pseudo random noise code (e.g., a Gold code), a constant amplitude zero autocorrelation ("CAZAC") sequence, etc. A given sequence that is unique to an access point can be stored in a non-transitory computer-readable medium or other suitable memory device of the access point.

In some aspects, a computing device in the validation sub-system can determine which access points are visible at a particular location within a coverage area serviced by the telecommunication system. Determining which access points are visible can allow the computing device to verify the signal coverage provided by an access point. Additionally or alternatively, determining which access points are visible can allow the computing device to find access points that are unintentionally "leaking" into a geographical region serviced by one or more other access points. In additional or alternative aspects, the computing device can use the received signal power to identify portions of the coverage area associated with low signal strength (e.g., RSSI). In additional or alternative aspects, the computing device can use the received signal power to verify performance in overlap regions (e.g., signal level in overlap regions).

In some aspects, the received signal power can be shown as a function of time. This can be useful for showing the composite RSSI level from multiple access points as an operator walks a particular path through a coverage area. Additionally or alternatively, the received signal power can be shown at a single location within the coverage area, thereby allowing an operator to identify intermittent failures.

In some aspects, the validation sub-system 102 can allow for the measurement of several RF system parameters with minimal hardware. At least some devices in the validation sub-system 102, such as the computing device, can be portable, which can allow for verification of the entire RF coverage area provided by a telecommunication system.

Although this disclosure has been described in detail with respect to specific aspects, examples, and features, those skilled in the art, upon attaining an understanding of the foregoing may readily produce alterations to, variations of, and equivalents to such aspects, examples, and features. Each of the disclosed aspects, examples, and features can be combined with one or more of the other disclosed aspects, examples, and features. Accordingly, it should be understood that the present disclosure has been presented for purposes of example rather than limitation, and does not preclude inclusion of such modifications, variations, or additions to the present subject matter as would be readily apparent to one of ordinary skill in the art.

What is claimed is:

1. A method comprising:
   simultaneously receiving, by a wireless receiver, beacon signals at a common frequency from a first access point and a second access point, the first access point and the second access point each configured for multiple-input/multiple-output operation, respectively, wherein each of the beacon signals has a data sequence that is different than other beacon signals, wherein the first access point and the second access point are associated with different respective multiple-input/multiple-output channels emitting different signals;
   determining, by a processing device and based on a correlation of the data sequences from the beacon signals as simultaneously received by the wireless receiver, an interaction between the first access point and the second access point detected by determining channel responses for channels between the first access point and the wireless receiver and between the second access point and the wireless receiver;
   outputting, by the processing device and based on the channel responses, an indicator that the first access point and the second access point are suitable for a specified multiple-input/multiple-output configuration of a telecommunication system for providing multiple-input/multiple-output wireless coverage using the first access point and the second access point.

2. The method of claim 1, wherein the specified configuration comprises using the first access point and the second access point for a multiple-input/multiple-output operation.

3. The method of claim 2, further comprising determining that the first access point and the second access point are suitable for the multiple-input/multiple-output operation based on determining that one of the channel responses is sufficiently different than other channel responses.

4. The method of claim 1, further comprising determining that the first access point and the second access point are suitable for the specified configuration of the telecommunication system based on an amount of constructive or destructive interference between the channels, the amount of constructive or destructive interference determined from the channel responses.

5. The method of claim 1, further comprising determining that the first access point and the second access point are suitable for the specified configuration of the telecommunication system based on determining from the channel responses that the channels have respective threshold amounts of capacity.

6. The method of claim 1, further comprising determining that sufficiently different polarization exists between two antennas or antenna sections of an access point in the telecommunication system and outputting an additional indicator of the sufficiently different polarization, wherein determining that the sufficiently different polarization exists comprises:
   simultaneously receiving, by the wireless receiver, two beacon signals having different data sequences and the same frequency from the access point;
   determining a channel response for a channel between the wireless receiver and with the access point; and
   determining, based on the channel response, that an amount of separation between the two beacon signals exceeds a threshold.

7. The method of claim 1, further comprising, prior to the wireless receiver receiving the beacon signals:
   determining, by a controller in the telecommunication system, used frequency resources assigned to a set of access points for communicating with wireless terminal devices in a common coverage cell formed by the set of access points, wherein the set of access points includes the first access point and the second access point;
   identifying, by the controller in the telecommunication system, an additional frequency resource for a time slot other than the used frequency resources for the common coverage cell;
   assigning, by the controller, the additional frequency resource to the first access point and the second access point; and
   configuring the first access point and the second access point to transmit the respective beacon signals during the time slot using the assigned frequency resource.

8. The method of claim 1, further comprising:
   simultaneously receiving, by the wireless receiver, additional beacon signals at the common frequency from additional access points, respectively, wherein the additional beacon signals have additional data sequences different from one another; and
   determining, by the processing device and based on the data sequences received by the wireless receiver, additional channel responses for additional channels between the additional access point and the wireless receiver,
   wherein the indicator also indicates that that the additional access points are suitable for the specified configuration.

9. A telecommunication system comprising:
   a first access point and a second access point each configured for multiple-input/multiple-output operation, wherein the first access point and the second access point are configured to simultaneously transmit respective beacon signals at a common frequency, wherein each of the beacon signals has a data sequence that is different than other beacon signals;

a control device communicatively coupled to the first access point and the second access point and configured to:
- receive an indicator associated with the beacon signals from a communication device in wireless communication with the first access point and the second access point, wherein the indicator is based on an interaction between the first access point and the second access point as determined from the data sequence of the beacon signals and the first access point and the second access point are associated with different respective multiple-input/multiple-output channels emitting different signals;
- determine, from the indicator associated with the beacon signals, that the first access point and the second access point are suitable for a specified multiple-input/multiple-output configuration of the telecommunication system, and
- based on the indicator, instruct the first access point and the second access point to communicate with wireless terminal devices using the specified multiple-input/multiple-output configuration.

10. The telecommunication system of claim 9, wherein the specified configuration comprises the first access point and the second access point configured for a multiple-input/multiple-output operation, wherein the indicator indicates that a first channel response associated with the first access point is sufficiently different from a second channel response associated with the second access point.

11. The telecommunication system of claim 9, wherein the first access point and the second access point are configured to provide a common coverage cell and the control device is further configured to:
- determine used frequency resources assigned to the first access point and the second access point for communicating with the wireless terminal devices in the common coverage cell;
- identify, prior to the first access point and the second access point transmitting the beacon signals, an additional frequency resource for a time slot other than the used frequency resources for the common coverage cell;
- assign the additional frequency resource to the first access point and the second access point; and
- instruct the first access point and the second access point to transmit the respective beacon signals during the time slot using the assigned frequency resource.

12. The telecommunication system of claim 9, wherein the indicator indicates that an amount of constructive or destructive interference between a first channel associated with the first access point and a second channel response associated with the second access point is suitable for the specified configuration.

13. The telecommunication system of claim 9, wherein the control device is configured to receive the indicator from a mobile computing device external to the telecommunication system.

14. A non-transitory computer-readable medium having instructions stored thereon that are executable by a processing device to perform operations, the operations comprising:
- identifying data sequences in beacon signals received simultaneously from a first access point and a second access point at a common frequency, respectively, wherein each of the beacon signals has a data sequence that is different than other beacon signals, and wherein the first access point and the second access point are each configured for multiple-input/multiple-output operation and the first access point and the second access point are associated with different respective multiple-input/multiple-output channels emitting different signals;
- determining, based on a correlation of the data sequences from the beacon signals as simultaneously received, an interaction between the first access point and the second access point detected by determining channel responses for channels via which a wireless receiver received the respective beacon signals; and
- based on determining the correlation, communicating an indicator to a control device of a telecommunication system that the first access point and the second access point are suitable for a specified multiple-input/multiple-output configuration of the telecommunication system for providing multiple-input/multiple-output wireless coverage using the first access point and the second access point.

15. The non-transitory computer-readable medium of claim 14, wherein the specified configuration comprises using the first access point and the second access point for a multiple-input/multiple-output operation.

16. The non-transitory computer-readable medium of claim 15, wherein the operations further comprise determining that the first access point and the second access point are suitable for the multiple-input/multiple-output operation based on determining that one of the channel responses is sufficiently different than other channel responses.

17. The non-transitory computer-readable medium of claim 14, wherein the operations further comprise determining that the first access point and the second access point are suitable for the specified configuration of the telecommunication system based on an amount of constructive or destructive interference between the channels, the amount of constructive or destructive interference determined from the channel responses.

18. The non-transitory computer-readable medium of claim 14, wherein the operations further comprise determining that the first access point and the second access point are suitable for the specified configuration of the telecommunication system based on determining from the channel responses that the channels have respective threshold amounts of capacity.

19. The non-transitory computer-readable medium of claim 14, wherein the operations further comprise determining that sufficiently different polarization exists between two antennas or antenna sections of an access point in the telecommunication system and outputting an additional indicator of the sufficiently different polarization.

20. The non-transitory computer-readable medium of claim 19, wherein determining that the sufficiently different polarization exists comprises:
- simultaneously receiving, by the wireless receiver, two beacon signals having different data sequences and the same frequency from the access point;
- determining a channel response for a channel between the wireless receiver and with the access point; and
- determining, based on the channel response, that an amount of separation between the two beacon signals exceeds a threshold.

* * * * *